United States Patent
Massonnat

(10) Patent No.: US 10,180,516 B2
(45) Date of Patent: Jan. 15, 2019

(54) METHOD OF DETERMINING CHANNELWAY TRAJECTORIES

(71) Applicant: TOTAL SA, Courbevoie (FR)

(72) Inventor: Gérard Massonnat, Pau (FR)

(73) Assignee: TOTAL SA, Courbevoie (FR)

(*) Notice: Subject to any disclaimer, the term of this patent is extended or adjusted under 35 U.S.C. 154(b) by 521 days.

(21) Appl. No.: 14/419,839

(22) PCT Filed: Aug. 6, 2013

(86) PCT No.: PCT/FR2013/051891
§ 371 (c)(1),
(2) Date: Feb. 5, 2015

(87) PCT Pub. No.: WO2014/023908
PCT Pub. Date: Feb. 13, 2014

(65) Prior Publication Data
US 2015/0205003 A1    Jul. 23, 2015

(30) Foreign Application Priority Data

Aug. 6, 2012 (FR) ................................. 12 57649

(51) Int. Cl.
*G06F 17/10* (2006.01)
*G01V 99/00* (2009.01)

(52) U.S. Cl.
CPC ............ *G01V 99/005* (2013.01); *G06F 17/10* (2013.01)

(58) Field of Classification Search
CPC ............................. G06F 17/10; G01V 99/005
USPC .................................................. 703/2, 9, 10
See application file for complete search history.

(56) References Cited

U.S. PATENT DOCUMENTS

| 7,483,822 B2 * | 1/2009 | Le Ravalec-Dupin ..................... G01V 99/00 702/12 |
| 2002/0013687 A1 * | 1/2002 | Ortoleva ............. E21B 41/0064 703/10 |
| 2003/0028325 A1 * | 2/2003 | Roggero ................ G01V 11/00 702/11 |
| 2013/0262063 A1 | 10/2013 | Massonat et al. |
| 2014/0214387 A1 * | 7/2014 | Tilke .................... E21B 43/305 703/10 |

FOREIGN PATENT DOCUMENTS

WO    WO 2012/072923 A2    6/2012

OTHER PUBLICATIONS

International Search Report and Written Opinion for PCT/FR2013/051891, dated Jan. 17, 2014, 10 pages.
Enghsh translation of International Search Report and Written Opinion for PCT/FR2013/051891, dated Jan. 17, 2014, 10 pages.

* cited by examiner

*Primary Examiner* — Andre Pierre Louis
(74) *Attorney, Agent, or Firm* — Patterson Thuente Pedersen, P.A.

(57) ABSTRACT

The present invention relates to a method of modelling channel ways. In particular, this method comprises steps for determining a set of stochastic channelway trajectories as a function of a local directional component and of a trigonometric component and for providing the determined trajectory of the channel way which complies with a certain number of constraints. A point of one of the trajectories belongs to an entry constraint. Finally, the set of trajectory constraints is complied with by the determined set of trajectories.

12 Claims, 9 Drawing Sheets

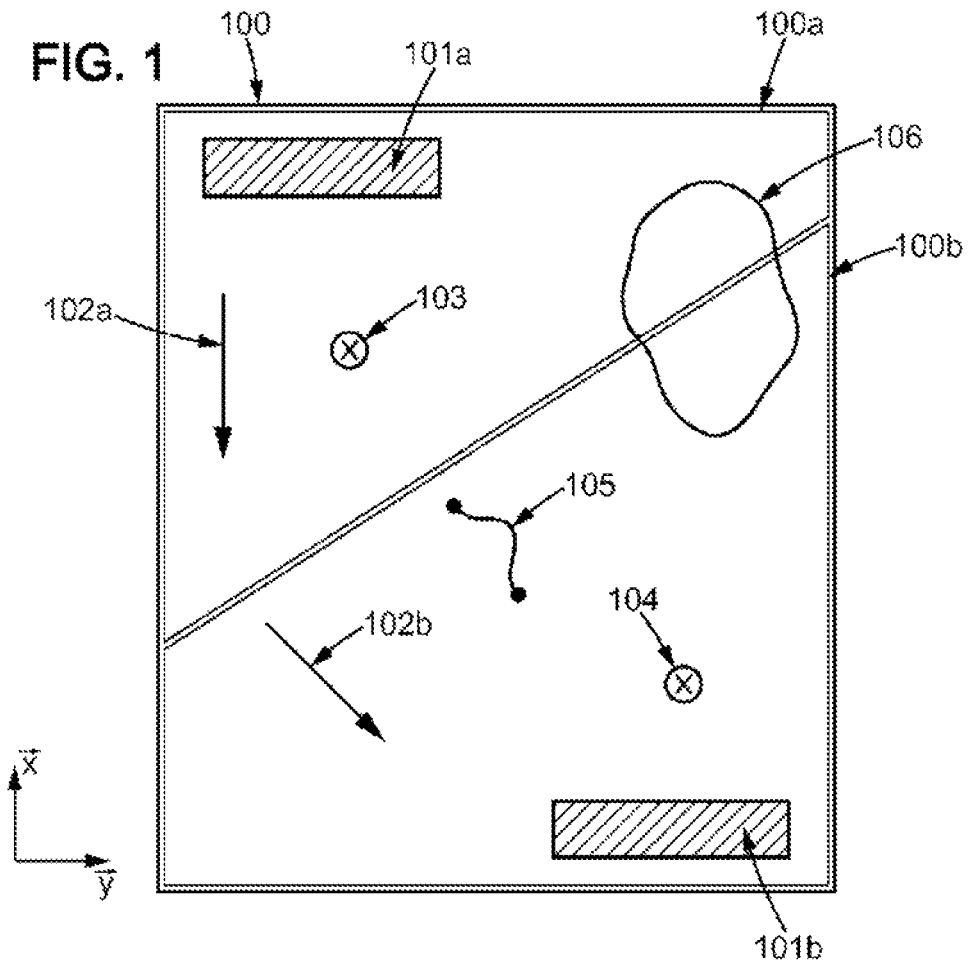
FIG. 1
FIG. 2a

METHOD OF DETERMINING CHANNELWAY TRAJECTORIES

RELATED APPLICATIONS

The present application is a National Phase entry of PCT Application No. PCT/FR2013/051891, filed Aug. 6, 2013, which claims priority from FR Patent Application No. 12 57649, filed Aug. 6, 2012, said applications being hereby incorporated by reference herein in their entirety.

FIELD OF THE INVENTION

The present invention relates to the domain of subsoil modeling. Of particular interest is the modeling of former channels for reconstructing the sedimentary facies of the subsoil.

BACKGROUND OF THE INVENTION

The determination of the sedimentary facies in a subsoil is often a necessary step in determining the capacity of this subsoil to trap hydrocarbons.

A facies serves to describe a litho-stratigraphic stage, a rock or a mineral. For example, it is possible to speak of an isometric facies (minerals/rocks exhibiting substantially equal dimensions in the three directions in space such as galena or garnet), of an elongated facies (minerals/rocks exhibiting developed crystals spreading in a single direction), of a tabular facies (minerals/rocks exhibiting developed crystals spreading in two directions in space), etc.

To determine these facies, it may be useful to produce drillholes at various points of interest. Thus, it is possible on the basis of drill cores to determine the various facies vertically as a function of depth.

Nonetheless, these drillholes being necessarily pointlike, the facies outside of these drillholes remain unknown. Certain geostatistic procedures propose filling in the gap in knowledge between the drilling wells by interpolating the facies between the wells as a function of the variance and by taking into account the spatial distribution of these facies.

Such procedures are not devoid of defects.

Indeed, these procedures do not take into account the data originating from seismic sources though the latter may give useful information as regards the orientations of the former sedimentary facies in the domain studied, for example, the orientation of the former channels.

Moreover, these procedures do not take into account the information according to which certain lithographic layers of different wells are connected together.

There is thus a need to improve the existing subsoil modeling procedures so as to take certain of this information into account.

The present invention therefore improves the situation.

SUMMARY OF THE INVENTION

For this purpose, the present invention proposes the determination of channel trajectories while taking into account certain route constraints observed over the terrain.

The present invention is thus aimed at a method implemented by computer for the modeling of channels. On the basis of a model comprising at least one space of points, said points having coordinates in said space, an entry constraint comprising at least one first point of said space, at least one trajectory constraint comprising at least one second point in said space not included in the entry constraint, and a local directional component being dependent on the coordinates in the space, the method comprises the steps of:

determining a third point from among the points of the entry constraint, said third point being taken as current point, initializing a trigonometric component and an iteration number, said trigonometric component being at least dependent on said iteration number, determining at least one trajectory in said space, said determination is carried out by iteration of the following sub-steps:

a/ drawing of a random number and incrementation of the iteration number;

b/ determination of a deviation as a function of the trigonometric component and of the random number drawn;

c/ determination of a fourth point of the space as a function of said deviation, of the directional component, and of the coordinates of the current point;

d/ addition of said fourth point to said trajectory;

e/ iteration of the sub-steps a/ to e/ while taking the fourth determined point as current point as long as an end criterion is not complied with;

if the at least one determined trajectory does not comprise at least the second point of the trajectory constraint, recommencing the steps of said method, otherwise providing the at least one determined trajectory.

A constraint (trajectory constraint, entry constraint, exit constraint, etc.) is a set of conditions having to be complied with by the trajectories determined. The constraint is said to be complied with if the conditions imposed by this constraint are fulfilled. For example, these conditions can be the passing of the trajectory through certain points of the space, compliance with a certain curvature of the trajectory, a given number of trajectories, etc.

The entry constraint is complied with if at least one point of this constraint forms part of the trajectory. Usually, it is the first point of the trajectory which forms part of the entry constraint.

The trajectory constraint is complied with if at least the point (or the points) of this constraint belong to a determined trajectory.

The trigonometric component may be for example a function oscillating regularly between two extreme values (for example, the function Y*sin(x) oscillates between the values −Y and +Y with a frequency of 2*Pi). The iteration number is updated at each iteration. This updating makes it possible to increase this iteration number. For example, this iteration number can be increased by 1 at each iteration or else by 0.1. Of course, the trigonometric component may also be dependent on other parameters. The random number can make it possible to give a degree of freedom as regards the determination of the deviation. For example, if the random number is R and the iteration number is k, this deviation may be Y*sin(k)+R (adopting the previous trigonometric function). This deviation can be calculated with reference to the directional component.

Advantageously, this method makes it possible to considerably reduce the number of conceivable trajectories. Thus, only the trajectories complying with a certain number of conditions (regarding curvatures, direction, trajectories, etc.) are retained.

The determination of a given trajectory, even if this determination is not unique, can allow professionals (for example, geologists) to approximate the geological reality of a modeled terrain and to obtain a convincing representation of a subsoil by undertaking a limited number of measurements (drillings, surveys, etc.).

Moreover, the model can comprise a plurality of trajectory constraints. Each trajectory constraint can then comprise at least one point in the space of points of said model. The provision of the trajectory can furthermore be subordinated to the fact that the at least one determined trajectory comprises said points of the plurality of trajectory constraints.

Indeed, the fact of adding a sizable number of trajectory constraints to the model may make it possible to appreciably restrict the domain of the trajectories that can be determined.

Thus, the determined trajectories may be closer to the geological reality of the real terrain modeled by the model.

In a particular embodiment, the method can comprise the determination of a plurality of trajectories.

Indeed, it may be apparent in certain zones that the geology or the topography of the terrain favors the creation of multiple channels. For example, the arms of the channel may be braided (such as for the river Waimakariri in New-Zealand). Moreover, the channels may exhibit points of simple confluence.

Moreover, a trajectory constraint can comprise a single point representing a point in a drilling well.

Thus, the trajectory constraint is pointlike (or quasi-pointlike). Indeed, it may be useful to produce drillholes to survey the terrain and obtain a discrete representation of the latter. These drillholes are thus modeled by pointlike constraints.

In a particular embodiment, a trajectory constraint can comprise a plurality of points representing a seismic datum. The provision of the trajectory can then be subordinated to the fact that at least one determined trajectory comprises said points representing a seismic datum.

When carrying out surveys by "seismic echography" (for example by means of seismic vibrator trucks), it may be possible to obtain a representation of the geological structures depth-wise by virtue of the analysis of the echoes of seismic waves.

On these representations, it may be possible to chart certain markers that are typical of former channels and thus add the channel sections charted as constraints to the model. Typically, these constraints may be sections of curves through which a trajectory must pass. For computational implementation reasons, these curves can be represented by a set of points situated in proximity. Of course, the trajectory can follow the order of the points on the section of curve so as to determine a trajectory close to geological reality.

As a supplement or as a variant, the model can comprise a plurality of ordered trajectory constraints. The provision of the trajectory can then be subordinated to the fact that the at least one determined trajectory comprises said points of the plurality of trajectory constraints, the order being complied with in the trajectory.

Indeed, it may be possible to determine that certain points of the space of the model are situated upstream on a trajectory to be determined with respect to other points. Thus, it may be useful to order these points and to ensure that these points preserve the same order in the trajectory. For example, assuming that the three constraints C1, C2 and C3 have a respective order of first, second and third, it may be useful to verify that the points P1, P2, P3 of the trajectory corresponding to these constraints are ordered in the same order in the trajectory.

In a particular embodiment of the invention, a local power can be associated with a determined trajectory. Thus, the trigonometric component of the trajectory can be dependent on the local power value.

This local power may thus be representative of the "capacity" of the channel to erode its bed. For example, when the current of the channel is sufficiently strong to erode the banks, the natural sinuosity may be accentuated by the centrifugal force which exerts a pressure on the outside part of the curve of the bed of the channel.

Thus, this local power may make it possible to determine trajectories of channels that are close to the geological reality of the terrain. This local power is for example associated with the channel (or with parts of the channel) by geologists.

Furthermore, the model can comprise an exclusion constraint, said exclusion constraint comprising at least one point of the space of points of the model. The provision of the trajectory can then be subordinated to the fact that the at least one determined trajectory does not comprise the at least one point of the exclusion constraint.

For example, this exclusion zone may represent a high altitude zone of the terrain or a zone exhibiting a rock which is very resistant to erosion. Thus, it may be decided that no channel bed is present in this zone. Thus, this exclusion zone may make it possible to determine trajectories of channels that are close to the geological reality of the terrain.

Likewise, the model can comprise an exit constraint, the exit constraint comprising at least one point of the space. The provision of the trajectory can then be subordinated to the fact that the at least one determined trajectory comprises the at least one point of the exit constraint. Moreover, the end constraint can comprise that the current point lies in the exit constraint.

Thus, the determined trajectories may be chosen so as to satisfy further constraints such as the presence of river mouths. Thus, this exit constraint may make it possible to determine trajectories of channels that are close to the geological reality of the terrain.

In a particular embodiment, each trajectory constraint can comprise an entry point. The determination of each trajectory can comprise furthermore:

f/ after determination of the fourth point, determining a set of points of the space which are accessible from said third point.

The addition of the third point to said trajectory can then be subordinated to the fact that each entry point belongs to the union of the sets of accessible points, otherwise taking no account of a determined number of previous iteration in the determination of the at least one trajectory.

This verification before the addition of the fourth point to the trajectory may make it possible to avoid a determination of trajectories not making it possible, in any way, to comply with the trajectory constraints and/or exit constraints imposed on the latter. Thus, the determinations of trajectories may be more effective.

A computational program, implementing all or part of the method described hereinabove, installed on a pre-existing item of equipment, is in itself advantageous, provided that it makes it possible to restrict the number of possible trajectories as a function of certain constraints.

Thus, the present invention is also aimed at a computational program comprising instructions for the implementation of the method described above, when this program is executed by a processor.

FIG. 10, described in detail hereinafter, can form the flowchart of the general algorithm of such a computational program.

A device intended to determine trajectories of channels can be advantageous, in itself, provided that it makes it possible to restrict the number of possible trajectories as a function of certain constraints.

Thus, the present invention is also aimed at a device for the modeling of channels, the device being devised to implement the steps of the method described above.

Other characteristics and advantages of the invention will be further apparent on reading the description which follows. The latter is purely illustrative and must be read with regard to the appended drawings in which:

BRIEF DESCRIPTION OF THE DRAWINGS

FIG. 1 represents an exemplary model for determining channel trajectories;

FIGS. 2a, 2b and 2c represent possible trajectories of channels;

DETAILED DESCRIPTION OF THE DRAWINGS

Figure 2B:
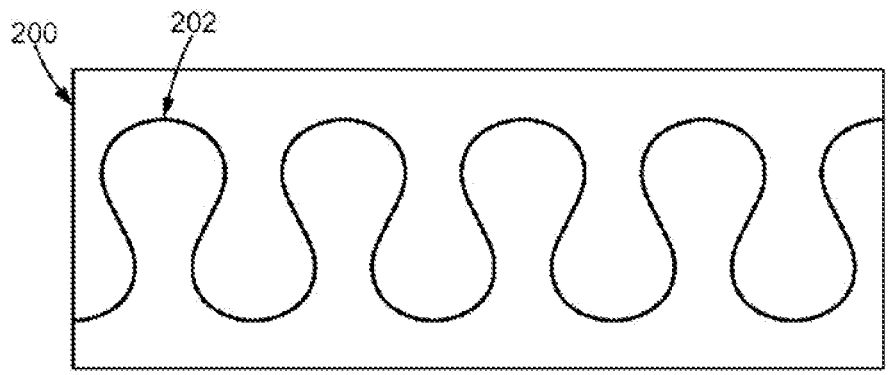

FIG. 1 represents an exemplary model for determining channel trajectories. In this embodiment, the model comprises a space of points 100 in two dimensions (along the directions $\vec{x}$ and $\vec{y}$ of the space) representing, for example, a real geological terrain. Of course, this space of points may be continuous or discrete. In the discrete case, the points of this space may be disposed according to a regular grid in the plane $(\vec{x}, \vec{y})$.

Moreover, this model comprises multiple trajectory constraints (103, 104, 105).

The constraints 103 and 104 are points representing the real location of survey/drilling wells in the terrain. They are called "well constraints". After drilling these wells, it is established that the two wells (represented by the constraints 103 and 104) are linked and that the bed of a former channel has a trajectory passing through at least at these two points 103 and 104.

To establish that two wells are "linked", it is for example possible to create a strong overpressure in one of the wells and to measure the pressure induced in another. Should the pressure rise in the latter, the wells are considered to be linked. Of course, the distance between the two wells can be used to evaluate an overpressure threshold beyond which the wells will be considered to be linked.

The constraint 103 (respectively 104) is said to be complied with if the point of the constraint 103 (respectively 104) belongs to the trajectory of the channel.

The trajectory of a channel can be defined as being the line central to the bed of the channel. The trajectory can also be defined as being the set of points of the space of points included in the bed of the channel: in the latter case, we speak of a "dressed" trajectory.

The constraint 105 is a seismic constraint. When studying the subsoil of a geological terrain, it may be difficult, lengthy and expensive to carry out a large number of drillings.

Seismic analyses are thus also carried out. These analyses provide images of the geological layers making it possible occasionally to identify certain channel meanders. These meanders are identified on the model by a curve (105) or by an ordered series of points (discrete definition of the curve). Thus, this seismic constraint compels the trajectory of the channel to follow the curve 105 by entering through one of its extremities (i.e. entry point of the constraint) and by exiting through the other (i.e. exit point of the constraint). One of the extremities (i.e. the entry point) is then identified in the model as being "upstream" of the other extremity (i.e. the exit point) so as to orient the curve.

The exclusion constraint 106 is a zone of the space of points wherein no trajectory can be envisaged. For example, this zone represents a high altitude zone of the terrain or a zone exhibiting a rock that is very resistant to erosion. Thus, it is decided that no channel bed has formed in this zone.

Moreover, an entry zone 101a (or "entry constraint") and an exit zone 101b (or "exit constraint") are identified in the model. During the determination of the trajectory, the initial point of the trajectory is chosen in the entry zone to start the latter. It is also possible to speak of the "source" of the channel. The determination of the trajectory also takes into account the exit constraint by ensuring that one of the last points of the determined trajectory belongs to this zone.

The model according to the embodiment of FIG. 1 is plane along the axes $\vec{x}$ and $\vec{y}$. For all that, the real terrain represented by this model is not necessarily plane. Indeed, this terrain may exhibit declivities, faults, etc. Thus, and for the sake of simplification, the model "flattens" the real terrain. Nonetheless, to preserve this information, a local directional component is added to the model so as to account for the differences in height. For example, in the zone 100a, the local directional component 102a is directed in the direction $-\vec{x}$ (i.e. the entry zone 101a is situated in a higher zone than the constraint point 103). Furthermore, in the zone 100b, the local directional component 102b is directed in the direction $-\vec{x}+\vec{y}$. Of course, this local directional component may be dependent on the coordinates (x, y) considered in the plane.

Figure 2C:
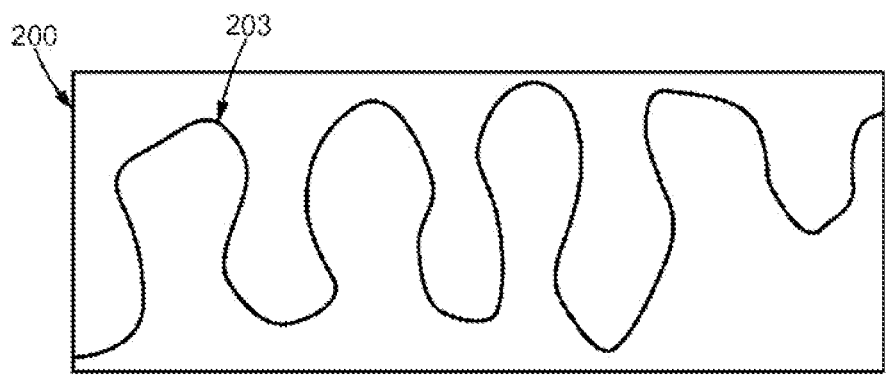

FIGS. 2a, 2b and 2c represent possible trajectories of channels. A channel possesses a natural tendency to have a trajectory oriented in the direction of the declivity. Thus, it is possible to determine a trajectory of a channel in a model 200 possessing a local directional component. The line 201 representing this trajectory then follows the local directional component.

Nonetheless, it is observed that real channels exhibit trajectories with meanders. These meanders comply, surprisingly, with a certain regularity in terms of deviation and beat frequencies. Thus, it is possible to model this meander through the use of a local directional component and a trigonometric component. This trigonometric component pertains to the angle formed by the trajectory with the local directional component during unit displacement in the trajectory. Thus, the trigonometric component may, for example, be a sinusoid exhibiting as abscissa the distance traversed on the trajectory and as ordinate the angular deviation of the trajectory with the local directional component. By way of illustration, FIG. 2b is an exemplary trajectory 202 obtained with a trigonometric component of the sinusoidal form exhibiting maxima of angular deviation at 100° and minima at −100°.

Moreover, a stochastic component can be added during the determination of the trajectory so as to confer a degree of freedom useful for satisfying the various constraints. Curve 203 is an exemplary trajectory obtained with the addition of a stochastic component. Thus, three different components participate in the formulation of this curve 203: a directional component, a trigonometric component and a stochastic component. The stochastic component may have an effect on the determination of the deviation (for example, by randomly drawing an additional value of deviation between −5° and +5° which is added to the trigonometric component) or on the unit displacement during the iterations for determining the trajectory (for example, by randomly drawing an additional value of displacement between −5% and +5% of the unit displacement value).

Figure 3:
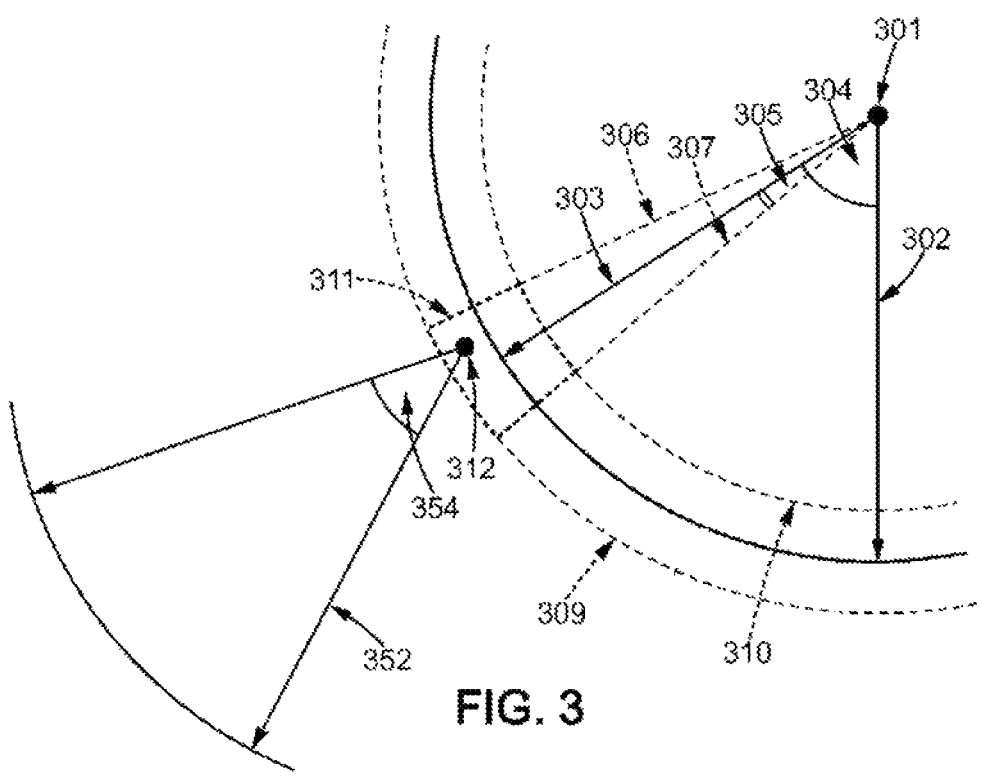
FIG. 3 details an exemplary iteration for a trajectory determination method.

FIG. 3 details an exemplary iteration for a method for determining the trajectory. On the basis of a current point 301 of the trajectory of a channel, it is possible to determine the next point of the trajectory 312 by performing an iterative method such as described hereinbelow.

The direction 302 of the local directional component is determined as a function of the coordinates of a current point 301 in the model. Moreover, a deviation 304 is also determined on the basis of the trigonometric component, as a function of the distance of the current point 301 from the "source" point in the trajectory. This deviation then makes it possible to site the next point in proximity to the tip of the arrow 303, this arrow 303 having a unit displacement length. This unit length is small relative to the dimensions of the model (for example 0.5% of the smallest dimension of the model). A stochastic component is then calculated:

an additional deviation 305 (between −5° and +5°, for example), this stochastic component then lying between the dashed lines 306 and 307; and/or
  an additional displacement (between −5% and +5% of the value of the unit displacement, for example), this stochastic component then lying between the dashed lines 309 and 310.

Thus, the next point 312 of the trajectory is a point of the zone 311 delimited by the curves 309, 310, 306 and 307. Of course, if there is no additional displacement (respectively no additional deviation), the zone 311 is reduced to a section of curve (respectively to a segment).

Of course, if the point identified (subsequent to the method described hereinabove) is not a point of the space of points of the model (for example, if the space of points is discretized and if the point identified is situated between several points of this space), the next point 312 is then chosen as the point of the space of points that is closest to the point identified.

The next point 312 then being determined within the zone 311, the method described is repeated by identifying the new local directional component 352 and by determining a new deviation 354 associated with this new point. The remainder of the method described above is then transposable to this new iteration.

Figure 4:
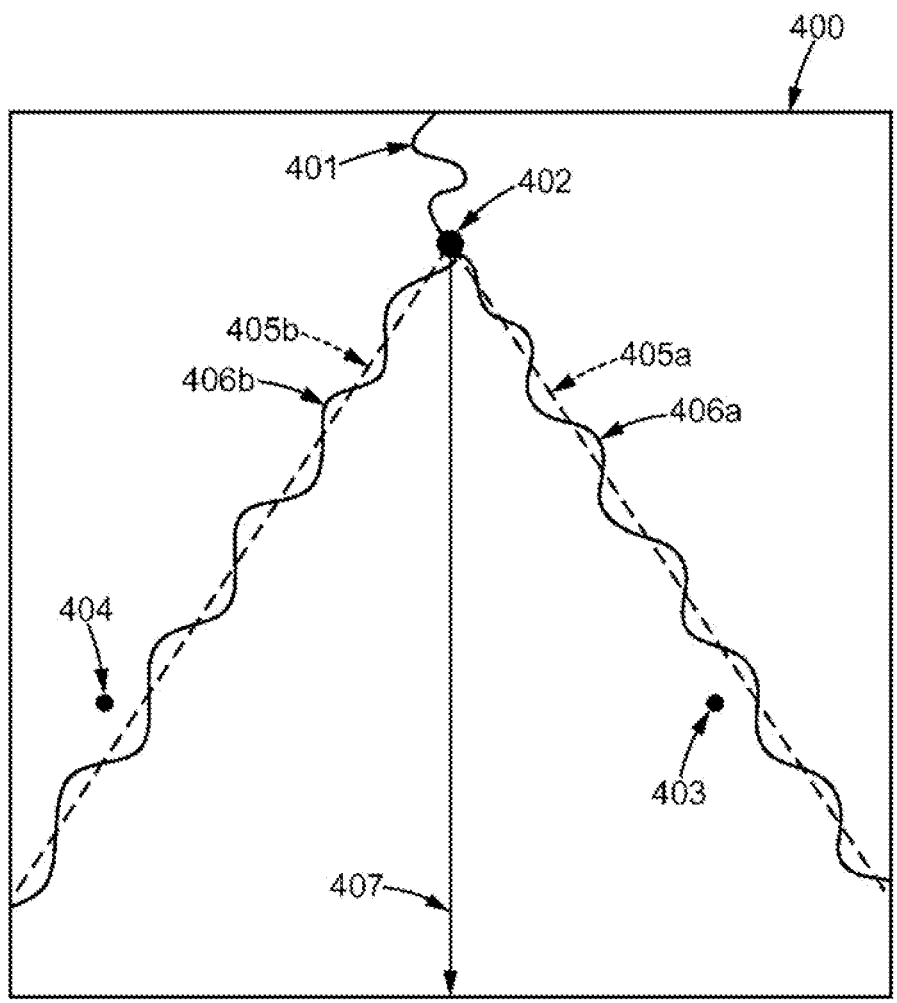
FIG. 4 illustrates the determination of the points of the model that are accessible from a given point of the model.

FIG. 4 illustrates the determination of the coordinates that are accessible from a current point of the model. Indeed, it is useful to determine whether the various pointlike constraints (or well constraints) are accessible from the current point. If this is not the case, it might not be useful to continue the simulation.

In the space of points 400, the determination of a trajectory 401 is underway according to the procedure presented above. The current point is the point 402.

Assuming that the trigonometric component is constant and corresponds to a deviation of 0°, it is apparent that the set of possible trajectories lie between the dashed lines 405a and 405b. Indeed, these lines are determined by taking an extreme stochastic component: either always a minimum (for example, a deviation of −5° with respect to the local directional component 407 oriented from top to bottom), or always a maximum (for example a +5° deviation with respect to the local directional component 407). Of course, the lines 405a and 405b are not necessarily straight. Indeed, the local directional component being able to evolve in the space 400, the orientation of the lines 405a and 405b may vary.

The use of a non-constant trigonometric component (for example, a sinusoidal component in the value varies between +45° and −45°) causes oscillation of the lines (406a and 406b) delimiting the set of possible trajectories in proximity to the two dashed lines described above (405a and 405b).

Thus, it is then possible to determine whether certain points of the space of points of the model are inaccessible directly (see FIG. 5 for details on the notion of "directly") by at least one trajectory from the current point 402: the points situated outside of the "oscillating cone" formed by the two lines 406a and 406b are considered to be directly inaccessible. Thus, in the example presented by FIG. 4, the point 404 is inaccessible directly from the current point 402 of the trajectory, while the point 403 is directly accessible.

Figure 5:
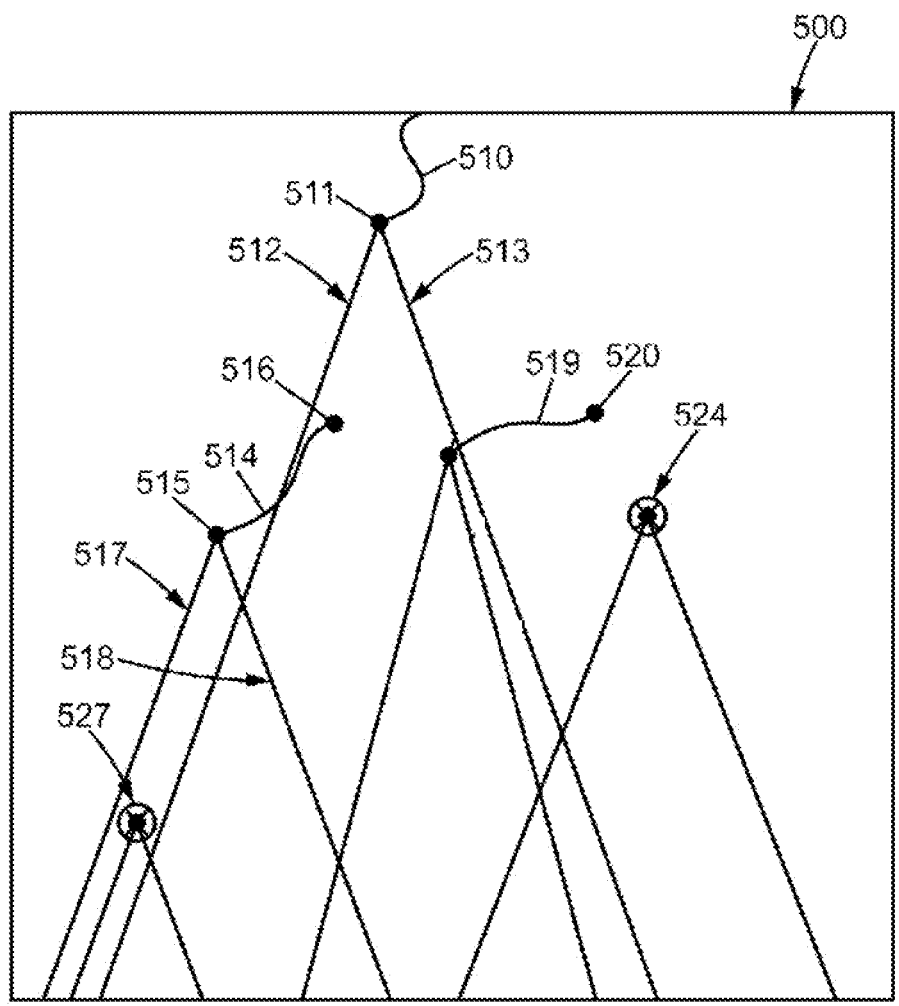
FIG. 5 illustrates the determination of the zones of so-called "accessibility" related to a given point of the model.

FIG. 5 illustrates the determination of an accessibility zone related to a current point of the model.

In the space of points of a model 500, the current point 511 is a point of the trajectory 510 which is undergoing determination. For example, this determination is that set forth above.

Furthermore, this model comprises four constraints: two seismic constraints 519 and 514, and two well constraints 524 and 527.

The lines 512 and 513 delimit the zone of the space of points of the model whose points are accessible directly from the current point 511. It should be noted that these lines are straight so as to simplify the representation given by FIG. 5, but their shapes may be more complex, as has been presented in FIG. 4. The phrase "a point under consideration is accessible directly" is intended to mean the fact that there exists a stochastic trajectory such as defined by FIG. 3 making it possible to link the current point and the point under consideration, without passing through points of intermediate constraints.

The seismic constraint 514 possesses two extremities: one of these extremities is an entry point 516 and the other is an exit point 515. In the example of FIG. 5, the entry point 516 belongs to the zone of direct accessibility related to the current point 511. Thus, it is possible to comply with the constraint 514, even if not all the points of the constraint 514 are situated in the zone of direct accessibility of the current point 511.

The "zone of direct and indirect accessibility" (or more generally called the "accessibility zone", without further detail) is defined as being the union:

of the zone of direct accessibility related to the current point (as described above);

of the points of the constraints that can be satisfied directly (i.e. whose constraint entry point is situated in the zone of direct accessibility);

of the zones of direct accessibility related to the exit points of the constraints that can be satisfied (directly or indirectly); and of the points of the constraints that can be satisfied indirectly (i.e. whose constraint entry point is situated in the zone of direct accessibility of an exit point of one of the constraints).

By way of illustration, the seismic constraint 514 can be satisfied directly, its entry point 516 being in the zone of direct accessibility related to the current point 511 (zone lying between the lines 512 and 513).

The seismic constraint 519 possesses an entry point 520 outside of the zone of direct accessibility of the current point 511. Even if this constraint 519 possesses points in the zone of direct accessibility related to the current point, this constraint cannot be satisfied.

The well constraint 527 is in the accessibility zone related to the current point 511 (even if it is not situated in the zone of direct accessibility related to this same point 511). Being in the zone of direct accessibility related to the exit point 515 (zone lying between the lines 517 and 518) of the constraint 514 which can be satisfied from the current point 511, thus it can also be satisfied (in an indirect manner).

Matters are different for the constraint 524 which is not accessible from the current point 511 (directly or indirectly). This constraint 524 cannot be complied with from the current point 511.

Ultimately, the accessibility zone of the current point 511 consists of the zone lying between the lines 512 and 513, of the points of the constraint 514 and of the zone lying between the lines 517 and 518.

Figure 7:
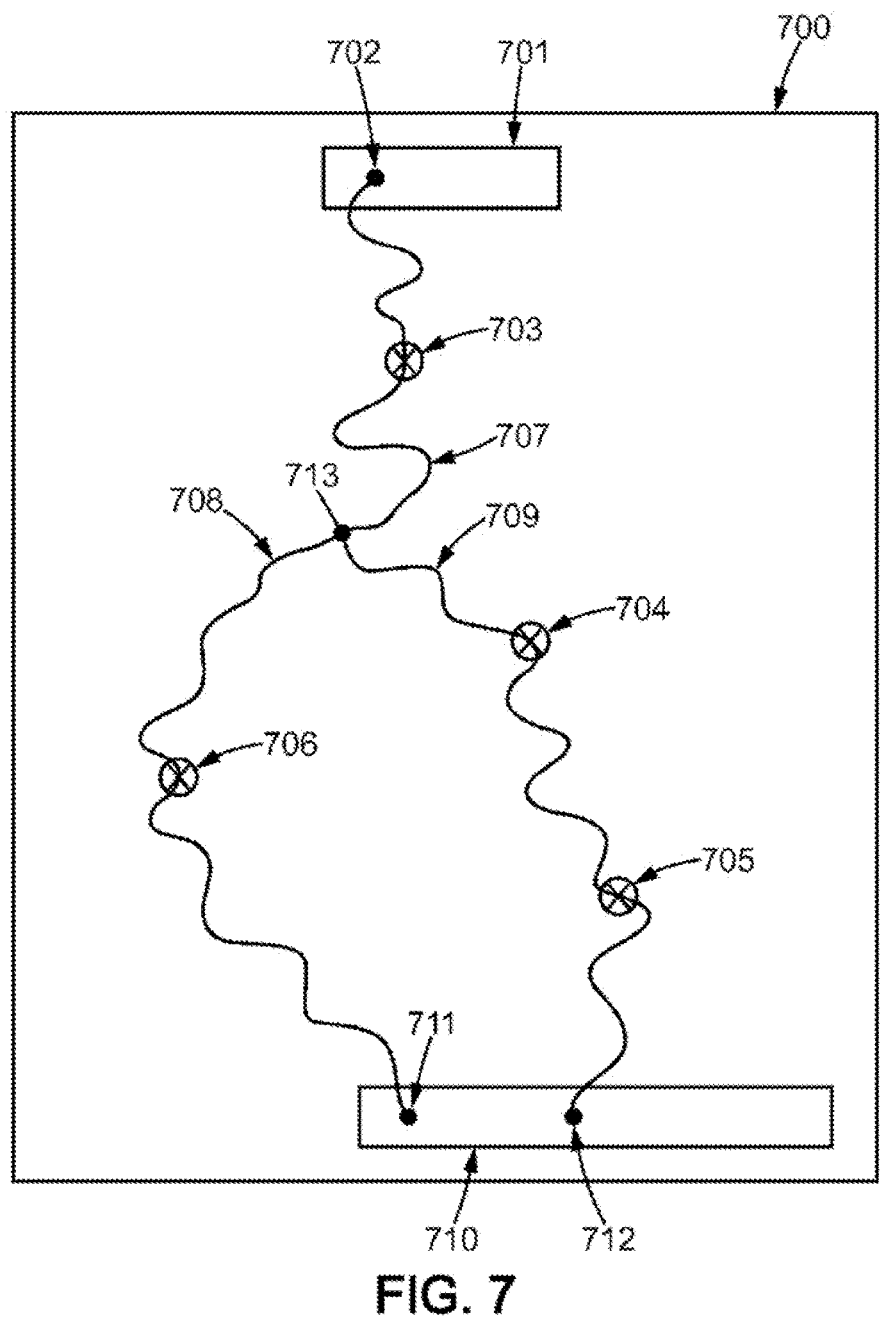
FIG. 7 represents the determination of a set of trajectories for a channel that divides into two sub-channels.

FIG. 7 represents the determination of a set of trajectories for a channel that divides into two sub-channels.

In the model 700, an entry constraint 701 and an exit constraint 710 are fixed. Moreover, well constraints (703, 704, 705 and 706) are defined within the space of points of the model.

It is known that a channel may divide into two sub-channels at a given locale of its trajectory (or that two sub-channels give rise to a main channel). Thus, the procedure for determining the trajectory can also allow division of the trajectory into two sub-trajectories. In the example of FIG. 7, two trajectories are defined:

a first trajectory formed of the trajectory sections 707 (i.e. from point 702 to the point 713) and 708 (i.e. from the point 713 to the point 711); and a second trajectory formed of the trajectory section 709 (i.e. from the point 713 to the point 712).

The trajectories of two channels are said to have been determined.

The trajectory of the first channel (i.e. 707 and 708) passes through the points 703 and 706. The trajectory of the first channel is said to comply with/satisfy the constraints of a first subset of constraints (set formed by the constraints 703 and 706).

The trajectory of the second channel (i.e. 709) passes through the points 704 and 705. The trajectory of the second channel is said to comply with/satisfy the constraints of a second subset of constraints (set formed by the constraints 704 and 705).

Of course, the trajectories of the first and of the second channel have one of their extremities (711 and 712) in the zone 710 representing the exit constraint. Thus, it is considered that the trajectory constraints of the model are complied with if each of the trajectory constraints is satisfied by at least one determined trajectory, this being the case in the example of FIG. 7.

Figure 8:
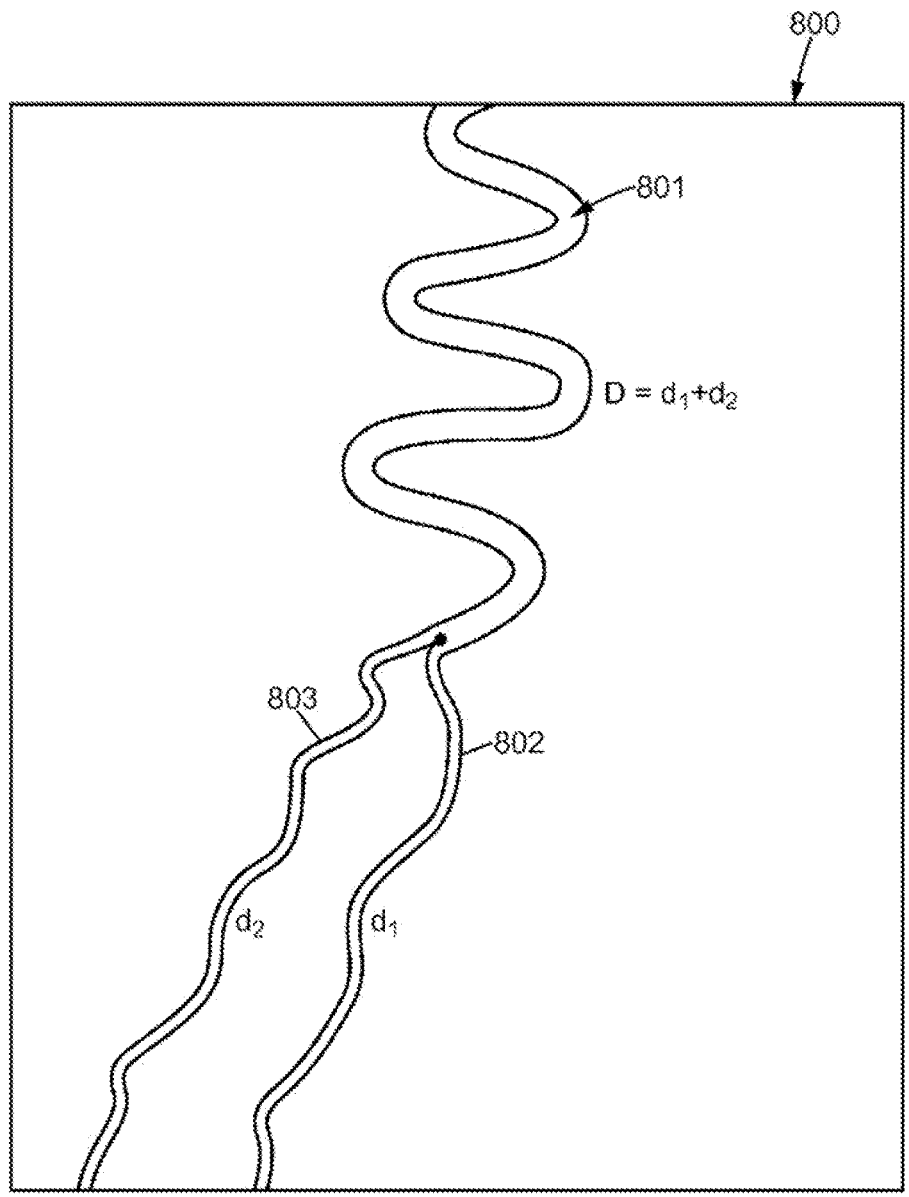
FIG. 8 is an exemplary possible variation of the trigonometric component along the trajectory of a channel.

FIG. 8 is an example of possible variation of the trigonometric component along a trajectory. Indeed, the frequency and amplitude of the trigonometric component may evolve along the trajectory.

This variation may be related to multiple parameters such as the speed of the water in the channel whose trajectory is simulated, the flowrate of the channel whose trajectory is simulated, etc.

For example, if the speed of the water of the channel is low (in the section of the trajectory 801, channel of "stream" type), the channel has a natural tendency to exhibit wide, ample meanders with a significant deviation. On the other hand, if the speed is significant, for example if the width of the channel decreases, (in the sections of the trajectory 802 and 803, channels of "torrent" type) the meanders are then less marked and the trajectory is more rectilinear.

A meander is a very pronounced sinuosity of the course of a stream or river which occurs naturally when the current is sufficient to erode the banks. A natural sinuosity is accentuated by the centrifugal force which exerts a pressure on the outside part of the curve.

The set of these parameters making it possible to determine the variation of the trigonometric component is then called the "power value".

Figure 9:
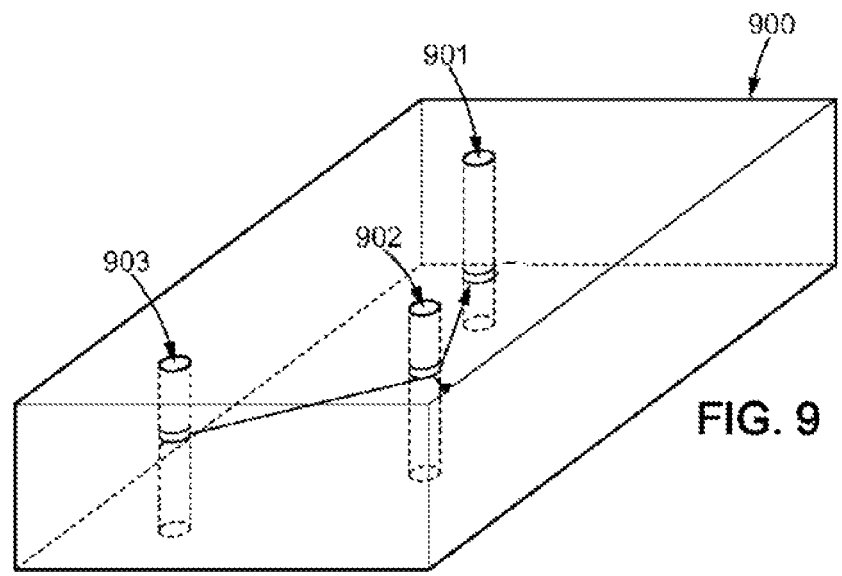
FIG. 9 details a three-dimensional model with three pointlike constraints.

FIG. 9 details a three-dimensional model having constraints of "well" type. Indeed, for the sake of simplification, the examples given above are two-dimensional examples, but one and the same approach can be carried out with three-dimensional examples.

In the example of FIG. 9, the space of points of the model 900 is a right-angled parallelepiped. The points 901, 902, and 903 are representations of the entry of vertical drilling wells produced in the modeled terrain.

The trajectory constraints are then positioned vertically in these wells. Thus, the trajectory constraints have coordinates along the three directions of the space. The generalization of the above two-dimensional examples to three-dimensional models can be seen, for example, as the application of the methods described above to projections of these three-dimensional models onto two distinct planes (for example the planes ($\vec{x}, \vec{y}$) and ($\vec{x}, \vec{z}$) in an orthogonal reference frame ($\vec{x}, \vec{y}, \vec{z}$)).

Figure 10:
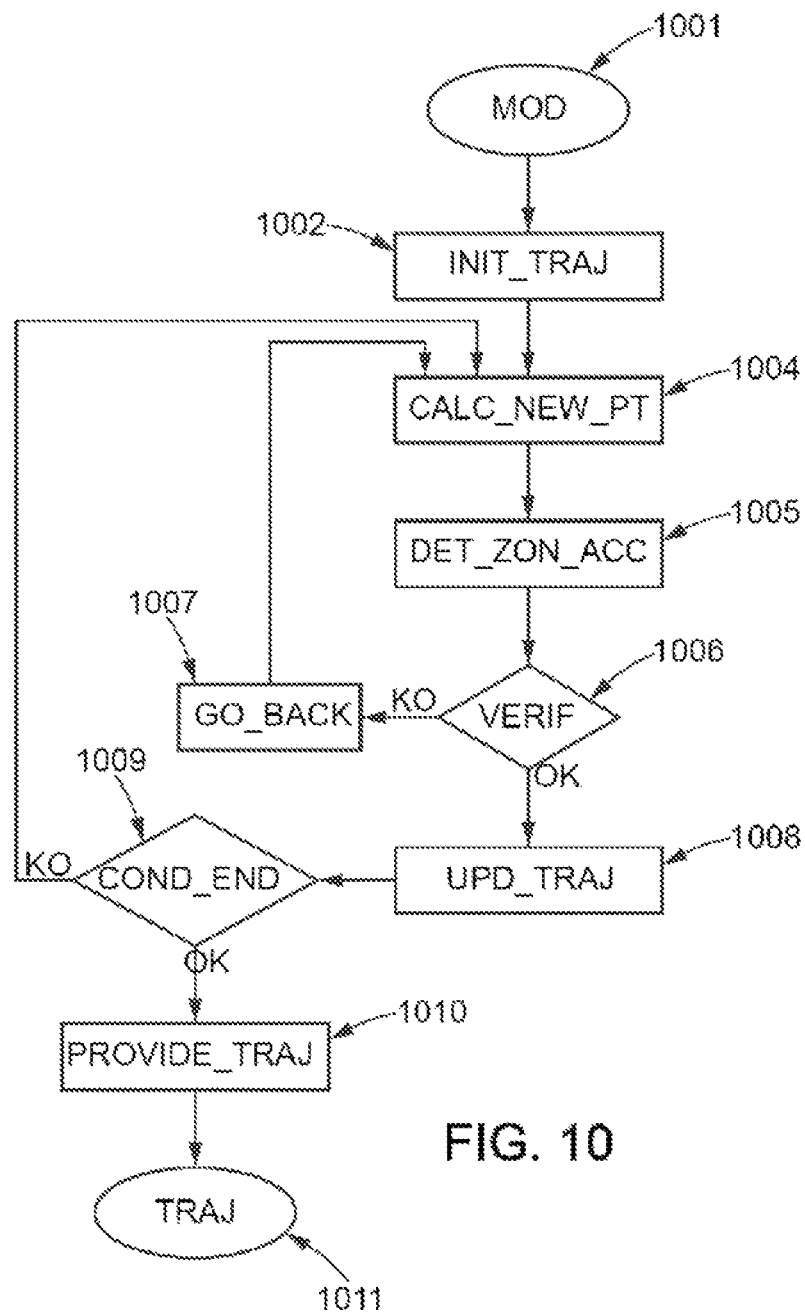
FIG. 10 is a flowchart of a method according to an embodiment of the invention.

FIG. 10 is a flowchart of a method according to an embodiment of the invention.

In this embodiment, a model 1001 is firstly received, for example in electronic format. For example, the model is a computational representation comprehensible to a piece of simulation software.

This model comprises a space of points, a local directional component (as described above) and trajectory constraints.

Furthermore, this model 1001 defines a zone of entry in this space of points. Firstly, a trajectory is then initialized (step 1002) by randomly choosing a point in this zone and by defining that this trajectory is composed, at this juncture, of this single point. This point is also called the "source point of the channel".

Subsequently, a new point is calculated (step 1004) using the procedure set forth above (in particular, when describing FIG. 3) and taking the initial point as current point.

Thereafter, an accessibility zone is determined (step 1005) according to the procedure set forth above (in particular, when describing FIGS. 4 and 5).

If a trajectory constraint cannot be complied with by the accessibility zone thus determined (verification 1006), it is useful to go back (step 1007) by repeating the steps of determining the trajectory on the basis of a chosen earlier point of this trajectory. Of course, the trajectory points added subsequent to this chosen earlier point are deleted from the trajectory. The chosen earlier point may be the point immediately preceding the point which has just been calculated in step 1004 but it may for example be a very much earlier point, such as a point of the last constraint through which the trajectory passed.

If all the points of the constraints lie in the accessibility zone (verification 1006), the second point is added to the trajectory (step 1008). The points of the trajectory are ordered since they represent the successive points through which it is necessary to pass so as to describe the route of the channel in the model.

For implementation reasons, it may be useful to define stopping conditions under which the determination of the trajectory stops. For example, these conditions may be, alternatively or cumulatively:
- a maximum number of iteration;
- a maximum determination time;
- the presence of a point, calculated in a predetermined zone (e.g. exit constraint), etc.

If these stopping conditions are not fulfilled (verification 1009), steps 1004, 1005, 1007, 1008 are repeated, taking the newly calculated point as current point. In the converse case, the trajectory 1011 thus determined is returned (step 1010). This return can be effected in computational format so as to allow, for example, viewing of the curves of the channels or subsequent simulation.

Furthermore, step 1004 can randomly provide for the creation of a new trajectory on the basis of the current point. This new trajectory is then determined independently with the aid of the method set forth hereinabove. The constraints may be distributed into two subsets beforehand, the first subset having to be complied with by the first trajectory, the second subset having to be complied with by the new trajectory.

Moreover, the functional diagram presented in FIG. 10 is a typical example of a program, certain instructions of which can be carried out with the equipment for determining trajectories. In this respect, FIG. 10 can correspond to the flowchart of the general algorithm of a computational program within the meaning of the invention.

Figure 6:
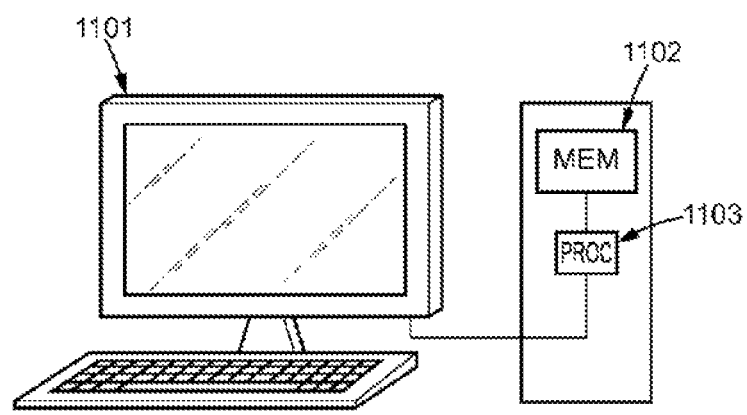
FIG. 6 represents an exemplary trajectory determination device.

FIG. 6 represents an exemplary device for determining trajectories 1101. In this embodiment, the device comprises a computer 1101, comprising a memory 1102 for storing the model and the trajectory, and processing means, for example a processor 1103 for performing the determinations of trajectories according to the method described above.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for mapping a plurality of channel trajectories in a subsoil area based on a selection of data from a geological terrain, the method comprises:
   creating a model of channels, on the basis of a space of points, said points having coordinates in said space, an entry constraint comprising at least one first point of said space, at least one trajectory constraint comprising at least one second point in said space not included in the entry constraint, and a local directional component being dependent on the coordinates in the space;
   determining a third point from among the points of the entry constraint, said third point being taken as current point,
   initializing a trigonometric component and an iteration number, said trigonometric component being at least dependent on said iteration number,
   determining at least one trajectory in said space, said determination is carried out by iteration of the following sub-steps:
   a/ drawing of a random number and incrementation of the iteration number;
   b/ determination of a deviation as a function of the trigonometric component and of the random number drawn;
   c/ determination of a fourth point of the space as a function of said deviation, of the directional component, and of the coordinates of the current point;
   d/ addition of said fourth point to said trajectory;
   e/ iteration of the sub-steps a/ to e/ while taking the fourth determined point as current point as long as an end criterion is not complied with;
   if the at least one determined trajectory does not comprise at least the second point of the trajectory constraint, recommencing the sub-steps of said method, otherwise providing the at least one determined trajectory;
   adding the determined trajectory to a map of the subsoil area to determine a capacity of the subsoil area to trap hydrocarbons; and
   drilling one or more wells in the subsoil area based on the at least one determined trajectory, said trajectory constraints representing a point in the one or more wells.

2. The method as claimed in claim 1, the model comprising a plurality of trajectory constraints, each trajectory constraint comprising at least one point in the space of points of said model, in which the provision of the trajectory is furthermore under a condition that the at least one determined trajectory comprises said points of the plurality of trajectory constraints.

3. The method as claimed in claim 1, in which the method comprises the determination of a plurality of trajectories.

4. The method as claimed in claim 1, in which a trajectory constraint comprises a single point representing a point in a drilling well.

5. The method as claimed in claim 1, in which a trajectory constraint comprises a plurality of points representing a seismic datum, and in which the provision of the trajectory is furthermore under a condition that at least one determined trajectory comprises said points representing a seismic datum.

6. The method as claimed in claim 1, in which the model comprises a plurality of ordered trajectory constraints, and in which the provision of the trajectory is furthermore under a condition that the at least one determined trajectory comprises said points of the plurality of trajectory constraints, the order being complied with in the trajectory.

7. The method as claimed in claim 1, in which, a local power value being associated with a determined trajectory, the trigonometric component of the trajectory is dependent on the local power value.

8. The method as claimed in claim 1, in which the model comprises, furthermore, an exclusion constraint, said exclusion constraint comprising at least one point of the space of points of the model, and in which the provision of the trajectory is furthermore under a condition that the at least one determined trajectory does not comprise the at least one point of the exclusion constraint.

9. The method as claimed in claim 1, in which the model furthermore comprises an exit constraint, the exit constraint comprising at least one point of the space, in which the provision of the trajectory is furthermore under a condition that the at least one determined trajectory comprises the at least one point of the exit constraint and in which the end constraint comprises that the current point lies in the exit constraint.

10. The method as claimed in claim 1, in which each trajectory constraint comprises an entry point, in which the determination of each trajectory furthermore comprises:
f/ after determination of the fourth point, determining a set of points of the space which are accessible from said third point, and in which an addition of the third point to said trajectory is under a condition that each entry point belongs to a union of the sets of accessible points, otherwise taking no account of a determined number of previous iteration in the determination of the at least one trajectory.

11. A device for a modeling of channels between a plurality of drillholes, the device comprising at least:
a memory and processor configured to perform the steps of:
creating a model of the channels, on basis of a space of points, said points having coordinates in said space, an entry constraint comprising at least one first point of said space, at least one trajectory constraint comprising at least one second point in said space not included in the entry constraint, the at least one trajectory constraint being an actual terrain location based on a point from one of the drillholes, and a local directional component being dependent on the coordinates in the space;
/i/ determining a third point from among the points of the entry constraint, said third point being taken as current point,
/ii/ initializing a trigonometric component and an iteration number, said trigonometric component being at least dependent on said iteration number: and
/iii/ determining at least one trajectory in said space, said determination is carried out by iteration of the following sub-steps:
a/ drawing of a random number and incrementation of the iteration number;
b/ determination of a deviation as a function of the trigonometric component and of the random number drawn;
c/ determination of a fourth point of the space as a function of said deviation, of the directional component, and of the coordinates of the current point;
d/ addition of said fourth point to said trajectory;
e/ iteration of the sub-steps a/ to e/ while taking the fourth determined point as current point as long as an end criterion is not complied with;
if the at least one determined trajectory does not comprise at least the second point of the trajectory constraint, recommencing steps /i/, /ii/ and /iii/, otherwise providing the at least one determined trajectory;
outputting a subsoil model that includes the determined trajectories; and
drilling one or more wells in the subsoil area based on the at least one determined trajectory, said trajectory constraints representing a point in the one or more wells.

12. A non-transitory computer readable storage medium for caching a computer program comprising program instructions, the computer program outputting a map of a subsoil area, the map based on drilling a well in the subsoil area, by modeling of channels, said computer program being executed by a processor for the modeling of channels comprising the steps of:
creating a model of the channels, on basis of a space of points, said points having coordinates in said space, an entry constraint comprising at least one first point of said space, at least one trajectory constraint comprising at least one second point in said space not included in the entry constraint, the trajectory constraint representing a point in the well a local directional component being dependent on the coordinates in the space;
/i/ determining a third point from among the points of the entry constraint, said third point being taken as current point,
/ii/ initializing a trigonometric component and an iteration number, said trigonometric component being at least dependent on said iteration number,
/iii/ determining at least one trajectory in said space, said determination is carried out by iteration of the following sub-steps:
a/ drawing of a random number and incrementation of the iteration number;
b/ determination of a deviation as a function of the trigonometric component and of the random number drawn;
c/ determination of a fourth point of the space as a function of said deviation, of the directional component, and of the coordinates of the current point;
d/ addition of said fourth point to said trajectory;
e/ iteration of the sub-steps a/ to e/ while taking the fourth determined point as current point as long as an end criterion is not complied with; if the at least one determined trajectory does not comprise at least the second point of the trajectory constraint, recommencing steps /i/, /ii/ and /iii/ otherwise providing the at least one determined trajectory; and
drilling one or more wells in the subsoil area based on the at least one determined trajectory, said trajectory constraints representing a point in the one or more wells.

* * * * *